(12) United States Patent
Heckerman et al.

(10) Patent No.: US 7,885,905 B2
(45) Date of Patent: Feb. 8, 2011

(54) FALSE DISCOVER RATE FOR GRAPHICAL MODELS

(75) Inventors: David E Heckerman, Bellevue, WA (US); Jennifer Listgarten, Redmond, WA (US); Carl M Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 11/873,440

(22) Filed: Oct. 17, 2007

(65) Prior Publication Data

US 2009/0106172 A1    Apr. 23, 2009

(51) Int. Cl.
    *G06F 15/18* (2006.01)
(52) U.S. Cl. ....................................................... 706/12
(58) Field of Classification Search .................. None
    See application file for complete search history.

(56) References Cited

U.S. PATENT DOCUMENTS

2002/0152035 A1* 10/2002 Perlin ........................... 702/20

OTHER PUBLICATIONS

Pradhan, 'Experimental Analysis of Large Belief Networks for Medical Diagnosis', 1994, AMIA, 0195-4210, pp. 775-770.*

Listgarten, et al. "Determining the number of non-spurious arcs in a learned DAG model: Investigation of a Bayesian and a frequentist approach" (Jul. 2007) Proceedings of the 23rd Conference on Uncertainity in Artificial Intelligence, 8 pages.

* cited by examiner

*Primary Examiner*—Michael B. Holmes
*Assistant Examiner*—Peter Coughlan
(74) *Attorney, Agent, or Firm*—Lee & Hayes, PLLC

(57) ABSTRACT

The claimed subject matter provides systems and/or methods that determines a number of non-spurious arcs associated with a learned graphical model. The system can include devices and mechanisms that utilize learning algorithms and datasets to generate learned graphical models and graphical models associated with null permutations of the datasets, ascertaining the average number of arcs associated with the graphical models associated with null permutations of the datasets, enumerating the total number of arcs affiliated with the learned graphical model, and presenting a ratio of the average number of arcs to the total number of arcs, the ratio indicative of the number of non-spurious arcs associated the learned graphical model.

16 Claims, 8 Drawing Sheets

FALSE DISCOVER RATE FOR GRAPHICAL MODELS

BACKGROUND

In many application areas where graphical models are used and where their structure is learned from data, the end goal is neither prediction nor density estimation. Rather, it is the uncovering of discrete relationships between entities. For example, in computational biology, one can be interested in discovering which proteins within a large set of proteins interact with one another or which miRNA (e.g., micro ribonucleic acid—single-stranded ribonucleic acid molecules that regulate gene expression) molecules target which mRNA (e.g., messenger ribonucleic acid—a molecule of ribonucleic acid encoding a chemical "blueprint" for a protein product) molecules. In these problems, relationships can be represented by arcs in a graphical model. Consequently, given a learned model, it can be beneficial to determine how many of the arcs are real or non-spurious.

Previous attempts to address the problem of uncovering discrete relationships between entities have involved computing confidence measures on arcs (and other features) of induced Bayesian networks by using a bootstrap (or parametric bootstrap). By re-modeling data, and using a Bayesian network for each sampled data set, such attempts have enumerated the number of times a given arc has occurred and estimated a probability of that arc, $\hat{p}_i$ as the proportion of times it is found across all bootstrap samples. Nevertheless, such confidence measures typically do not estimate the number of non-spurious arcs. For example, applying a pathological search algorithm which systematically adds all arcs yields the estimate $\hat{p}_i=1$ for every arc.

Other attempts to provide solutions to the foregoing problem of identifying discrete relationships between entities have included using MCMC samples over variable orderings to compute marginal probabilities of arc hypotheses. Although such approaches have characterized the performance of the MCMC method, they typically have not determined whether the exact (or approximated) posterior probabilities have been accurate of calibrated in the sense that hypothesis labeled, for example, 0.4 are true 40% of the time.

Other more recent attempts to reveal discrete relationships between entities have utilized stochastic, greedy structure search algorithms, running such algorithms numerous (e.g., in excess of 1000) times to local optimums, and scoring each arc according to the proportion of times the arc appeared across all local optima found. Although such an approach can provide asymptotic guarantees, the approach nevertheless fails to yield accurate estimates on finite data.

In yet a further attempt to uncover discrete relationships between entities a frequentist test for edge inclusion in graphical Gaussian models (GGMs) has been developed, the technique provides a reasonable model for null distributions of this test wherein a score is assigned to each edge based on how much it "hurts" the model when each edge is independently removed (this is assessed in the presence of all other possible edges being included in the model—one-backward-step search for each edge). These scores can then be employed to compute a false discovery rate for a given set of edges. However, in application such an approach has been found to associate low scores to a vast quantity of real arc hypotheses resulting in inaccurate estimates of the false discovery rate.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In many application domains, such as computational biology, the goal of graphical model structure learning is to uncover discrete relationships between entities. For example, in one problem of interest concerning HIV (e.g., Human Immunodeficiency Virus) vaccine design, researches can want to infer which HIV peptides (e.g., polymers formed from the linking, in a defined order, of various α-amino acids) interact with which immune system molecules (e.g., Human Leukocyte Antigen (HLA) molecule—groups of genes that reside on chromosome 6, and that encode cell-surface antigen-presenting proteins and many other genes). For problems of this nature, there can be an interest in determining the number of non-spurious arcs in a learned graphical model. One approach utilized by the claimed subject matter to uncover the number of non-spurious arcs in a learned graphical model (e.g., directed acyclic graphs, undirected graphs, chain graphs, or factor graphs), known as a frequentist approach, employs a method based on the concept of the false discovery rate. On synthetic data sets generated from models similar to the ones learned, it has been found that such a frequentist approach yields accurate estimates of the number of spurious arcs. Additionally, the frequentist approach, which is non-parametric, can out perform parametric approaches (e.g., Bayesian approaches) in situations where the models learned are less representative of the data.

The claimed subject matter in accordance with an illustrative aspect provides a system that determines a number of non-spurious arcs associated with a learned graphical model. The system can include components and devices that utilize datasets and learning algorithms to generate learned graphical models and graphical models associated with null distribution datasets, enumerate an average number of arcs confederated with each of the graphical models associated with the null distribution datasets, determines a total number of arcs associated with the learned graphical model, and distributes the average number of arcs associated with the null distribution datasets and the total number of arcs associated with the learned graphical model as a result that indicates the number of non-spurious arcs associated with the learned graphical model.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
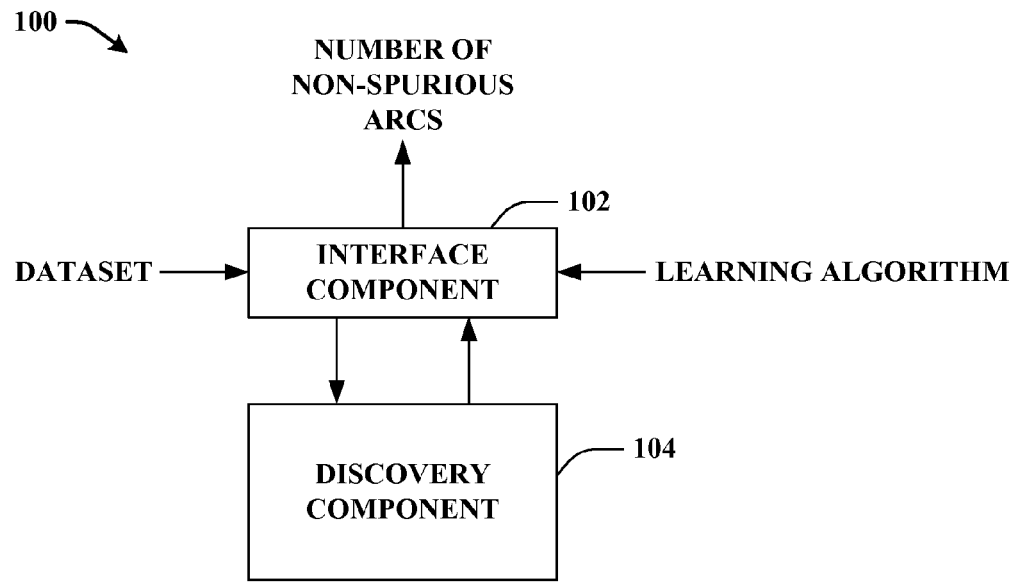
FIG. 1 illustrates a machine-implemented system that effectuates and facilitates determination of the number of non-spurious arcs associated with a learned graphical model in accordance with an aspect of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

For ease and clarity of exposition the claimed subject matter has been explicated in terms of the rational design of HIV (e.g., Human Immunodeficiency Virus) vaccines. Nevertheless, as will be appreciated by those conversant in the art, the subject matter as claimed is not so limited and can find applicability and utility in other contexts and fields of endeavor.

Typically there are two arms of the adaptive immune system: the humoral arm that manufactures antibodies, and the cellular arm that recognizes cells that are infected and kills them. The illustrative HIV vaccine design under consideration for purposes of elucidation of the claimed subject matter concentrates on the cellular arm. The cellular arm kills infected cells by recognizing short (e.g., 8-11 amino-acid long) bits of proteins, known as epitopes, that are can be presented on the surface of most human cells. The epitopes typically are the result of digestion of proteins (e.g., both normal and foreign) with the cell and are presented on HLA (e.g., Human Leukocyte Antigen) molecules, than can form a complex with the epitope before it is presented. Special cells of the immune system, known as T-cells (e.g., a group of white blood cells known as lymphocytes that can play a central role in cell-mediated immunity), can recognize the epitope-HLA complexes, and kill the cell if the epitopes correspond to foreign or non-self proteins.

There can be hundreds of types of HLA molecules across the human population; each person has from three to six different types, for example. Further, epitopes presented by one HLA type are typically different from those presented by another type. This diversity is thought to be useful in preventing a single virus or other pathogen from destroying the human race. One possible design of a cellular vaccine can then be to identify a set of peptides that are epitopes for a large number of people and assemble them in a delivery mechanism that can train T-cells to recognize and kill cells infected by HIV.

To identify peptide-HLA pairs that are epitopes, one can take a peptide and mix it with the blood (which can include T-cells) of an individual and watch for the release of gamma interferon which can indicate that the T-cell killing mechanism has been activated—an ELIspot assay. If the reaction occurs, it is likely that the peptide is an epitope for one of the HLA types of the patient. Although it is impossible to discern the HLA type or types that are responsible for a reaction from a single patient, with data from many patients one can infer (e.g., probabilistically) which of the patients HLA types are causing the observed immune reactions.

To perform this inference the claimed subject matter can be employed to model data through utilization of bi-partite graphs with noisy-OR distributions. Noisy-OR distributions are typically based on the assumption of independence of causal influence and can take the form:

$$p(y_j^k = 0 \mid \{q_{ij}\}, q_0) = (1 - q_0) \prod_{\{i \mid h_i^k = 1\}} (1 - q_{ij})$$

$$p(y_j^k = 1 \mid \{q_{ij}\}, q_0) = 1 - p(y_j^k = 0 \mid \{q_{ij}\}, q_0),$$

where $h_i^k = 1$ [0] denotes that patient k has [does not have] HLA allele i, and $y_j^k$ denotes the observed, binary reactivity for peptide j in patient k, and $q_{ij}$ is the link probability that peptide j reacts with HLA i (e.g., $q_{ij}$ is the probability that HLA i causes a reaction to peptide j in the absence of any other HLA molecules). It should be noted that the values if $q_{ij}$ are not always equal to one due, for example, to noise in the assay. Further, it should also be noted that although there can be correlations among HLA variables (e.g., due to linkage disequilibrium), in the current context these correlations are not of particular interest.

Accordingly, given a learned set of arcs representing peptide-HLA interactions, the claimed subject matter can determine how many of these arcs are real, so that an assessment can be made as whether any of them merit further confirmatory testing. In general, given a single model structure, learned by any method, the claimed subject matter can determine its expected number or non-spurious arcs. This determination can allow researchers to generate specific, testable hypotheses and gauge confidence in them before considering whether to pursue them further.

As employed herein without limitation, disclaimer, or prejudice, the term "arc hypothesis" can connote the event that an arc is present in an underlying distribution of the data. Accordingly, the claimed subject matter in accordance with an illustrative aspect overcomes the problem of estimating the number of true arc hypotheses in a given learned model.

FIG. 1 illustrates a system 100 that determines the number of non-spurious arcs in a learned graphical model. System 100 can include an interface component 102 (referred to hereinafter as "interface 102") that can receive datasets that can be descriptive of graphical models and algorithms that can be, or were, utilized to develop the graphical models (e.g., learning algorithms used to learn graphical models). The datasets can be represented as a series of rows and columns wherein each row can provide representative cases and each column variables associated with particular cases. Additionally, interface 102 can receive data associated with client applications, services, users, clients, devices, and/or entities involved with a particular transaction, a portion of a transaction, and thereafter can convey the received information to discovery component 104 for further analysis. Further, interface 102 can receive from discovery component 104 information regarding the number of non-spurious arcs (e.g., in the form of a number, such as, a fraction, an integer, a real number, floating-point number, etc.) that can subsequently be utilized to uncover discreet relationships between entities.

Interface 102 can provide various adapters, connectors, channels, communication pathways, etc. to integrate the various components included in system 100 into virtually any operating system and/or database system and/or with one another. Additionally, interface 102 can provide various adapters, connectors, channels, communication modalities, and the like, that can provide for interaction with various components that can comprise system 100, and/or any other component (external and/or internal), data, and the like, associated with system 100.

Discovery component 104 can estimate and control a false discovery rate (FDR) of a set of arc hypotheses (e.g., known as a frequentist approach). The false discovery rate (FDR) can be defined as the (expected) proportion of all hypotheses (e.g., arc hypotheses) which can be labeled as true, but which are actually false (e.g., the number of false positives divided by the number of total hypotheses called true). This approach typically addresses only the number of true arc hypotheses within a given set, and generally does not place a probability distribution jointly or marginally) on the arc hypotheses in the set. On application of the approach by discovery component 104 to synthetic datasets generated from models similar to ones learned indicates that the technique yields accurate estimates of the number of non-spurious arcs. Furthermore, indications are that the approach utilized herein is far more computationally efficient than other approaches (e.g., Bayesian) employed to date. Moreover, as a matter of interest, the frequentist approach employed by the claimed subject matter, and in particular discovery component 104, is a non-parametric technique that can outperform other parametric approaches (e.g., Bayesian) in situations where the models learned are less representative of the data.

As stated supra, discovery component 104 estimates and controls a false discovery rate (FDR) of a set of arc hypotheses (e.g., known as a frequentist approach). In order to effectuate such estimation and control discovery component 104 can solicit, obtain, or retrieve input, such as, for example, learning algorithms and datasets, from multiple sources (e.g., users, associated databases, disparate affiliated components, etc.). Upon receipt of input, discovery component 104 can apply the received learning algorithms against the received datasets to produce a graphical model (e.g., a graphical model derived from the received datasets) that can be represented as a bi-partite graph comprising nodes connected by arcs, for example. An example of such a bi-partite graph is provided in FIG. 10.

Once discovery component 104 has constructed a graphical model through utilization of received datasets and in conjunction with obtained leaning algorithms, discovery component 104 can utilize the received datasets to generate null datasets which can be applied against the learning algorithm utilized in the construction of the original graphical model to provide other graphical models (e.g., bi-partite graph) representative of each and every null dataset produced. Discovery component 104 can then locate and aggregate arcs in the graphical models generated utilizing null datasets and thereafter ascertain an average number present with respect to graphical models produced through use of null datasets. Further, discovery component 104 can also perform a similar identification and aggregation facility with respect to arcs associated with the original model (e.g., the model built using the original non-null datasets. Discovery component 104 can thereafter produce a false discovery rate (FDR) metric defined as the (expected) proportion of all hypotheses labeled as true, but which are actually false (e.g., the average number of arcs present with respect to graphical models produced through use of null dataset divided by the number of total arcs associated with the model built using the initially input non-null dataset). This false discovery rate can then be applied to uncover relationships between entities and to discern a relative authoritativeness with which such uncovered relationships should be treated.

When inferring whether a single hypothesis (e.g., arc) is true of not, statisticians have traditionally relied a p-value which can control the number of false positives (e.g., type I errors). However, when testing hundreds or thousands of hypotheses (e.g., hundreds or thousands of arcs) simultaneously, the p-value can need to be corrected to help avoid making conclusions based on chance alone (e.g., known as the problem of multiple hypothesis testing). A widely used, though conservative correction is the Bonferroni correction, that can control Family Wise Error Rates (FWER). The FWER can be considered a compound measure of error, generally defined as the probability of seeing at least one false positive among all hypotheses tested. In light of the conservative nature of methods which control the FWER, the statistics community has recently placed great emphasis on estimating and controlling a different compound measure of error the false discovery rate (FDR).

In a typical computation of false discovery rate (FDR) discovery component 104 can be provided a set of hypotheses (e.g., arcs in a constructed graphical model) where each hypothesis (e.g., an arc connecting nodes included in the constructed graphical model), i, can be assigned a score, si (traditionally, a test statistic, or the p-value resulting from such a test statistic). These scores can often be assumed to be independent and identically distributed, although there has nevertheless been much work to relax the assumption of independence. Discovery component 104 can thus compute the false discovery rate (FDR) as a function of a threshold, t, on these scores, FDR=FDR(t). For threshold t, all hypotheses with $S_i \geq t$ can be said to be significant (e.g., assuming, without loss of generality, that the higher a score, the more a hypothesis is believed). The false discovery rate (FDR) at threshold t can then be provided by:

$$FDR(t) = E\left[\frac{F(t)}{S(t)}\right],$$

Where S(t) can denote the number of hypothesis deemed significant at threshold t and F(t) can connote the number of those hypotheses considered to be false, and where expectation (e.g., what is considered the most likely to happen; a belief centered on the future, that may or may not be realistic), E, is taken with respect to the true joint distribution of the variables. When the number of hypotheses is large, as is usually the case, discovery component 104 can take the expectation of the numerator and denominator separately:

$$FDR(t) = E\left[\frac{F(t)}{S(t)}\right] \cong \frac{E[F(t)]}{E[S(t)]}.$$

Furthermore, it can often be sufficient to use the observed S(t) as an approximation for E[S(t)]. Thus, the computation effectuated by discovery component 104 of FDR(t) can boil down to the computation of E[F(t)]. Once approximation for this quantity which can be reasonable is $E[F(t)] \cong E_0[F(t)]$, where $E_0$ denotes expectation with respect to the null distribution (e.g., the distribution of scores obtained when no hypotheses are truly significant).

Note that the false discovery rate (FDR) can be closely related to positive predictive value (PPV), where $$PPV(t) = 1 - \frac{F(t)}{S(t)}.$$

That is, false discovery rate (FDR) can be 1 minus expected positive predictive value (PPV).

Applying this approach to estimating the number of non-spurious arcs (e.g., hypotheses) in a given graphical model, discovery component 104 can receive or obtain as input a particular structure search algorithm α (e.g., which may have hyperparameters such as K that can control the number of arcs learned) and can generalize S(·) and F(·) to be functions of algorithm α. In particular, S(α) can be the number or arcs found by algorithm α and F(α) the number of arcs whose corresponding hypotheses can be classified as false. Accordingly, discovery component 104 can utilize the approximation $E(S(\alpha)) \cong N(D,\alpha)$, where $N(D, \alpha)$ typifies the number of arcs found by applying α to the real data D. In addition, discovery component 104 can estimate $E_0(F(\alpha))$ to be $N(D^q, \alpha)$ averaged over multiple data sets $D^q$, q=1, . . . , Q, drawn from a null distribution. That is:

$$FDR(\alpha) = E\left[\frac{F(\alpha)}{S(\alpha)}\right] \cong \frac{E[F(\alpha)]}{E[S(\alpha)]} \cong \frac{\left(1 + \sum_{q=1}^{Q} N(D^q, \alpha)\right)/Q}{N(D, \alpha)}.$$

The addition of one to the numerator by discovery component 104 can smooth the estimate of $E_0[F(\alpha)]$ so as to take into account the number of random permutations performed.

In one aspect of the claimed subject matter it can be assumed that algorithm α has the property that it can be decomposed by discovery component 104 into independent searches for the parents of each node. Given this assumption, when discovery component 104 learns the parent set of a given node, it can create a null distribution for that node by permuting the real data for the corresponding variable. This permutation can guarantee that all arc hypotheses are generally false in the null distribution. The generation of these null distributions is typically computationally efficient as well as non-parametric, making them generally applicable to situations where the models learned are less representative of the data.

In a further aspect and in recognition that the frequentist estimation of false discovery rate (FDR) as utilized by discovery component 104 can occasionally be overly conservative for larger values of the false discovery rate (FDR) (e.g., smaller values of expected positive predictive value (PPV)), discovery component 104 can use a sequential approximation to $E_0[F]$, where instead of simply permuting the data and applying a search algorithm, discovery component 104 can recursively estimate $E_0[F(K)]$. Specifically, discovery component 104 can start with a relatively low value of $K=K_0$ so that only a few arcs are generated using the real data, and then estimate $E_0[F(K_0)]$. Then to estimate $E_0[F(K)]$ for larger values of K, $K=K_1$, discovery component 104 can initialize structure search using the $K_0$ structure and continue structure search using null data generated from this same structure (e.g., using a parametric bootstrap when necessary). Discovery component 104 can then utilize the estimate $E_0[F(K_1)] \cong E_0[F(K_0)]+n_1$, where $n_1$ represents the number of arcs added to the $K_0$ structure. This recursive procedure can then be continued, increasing K on each iteration.

Figure 2:
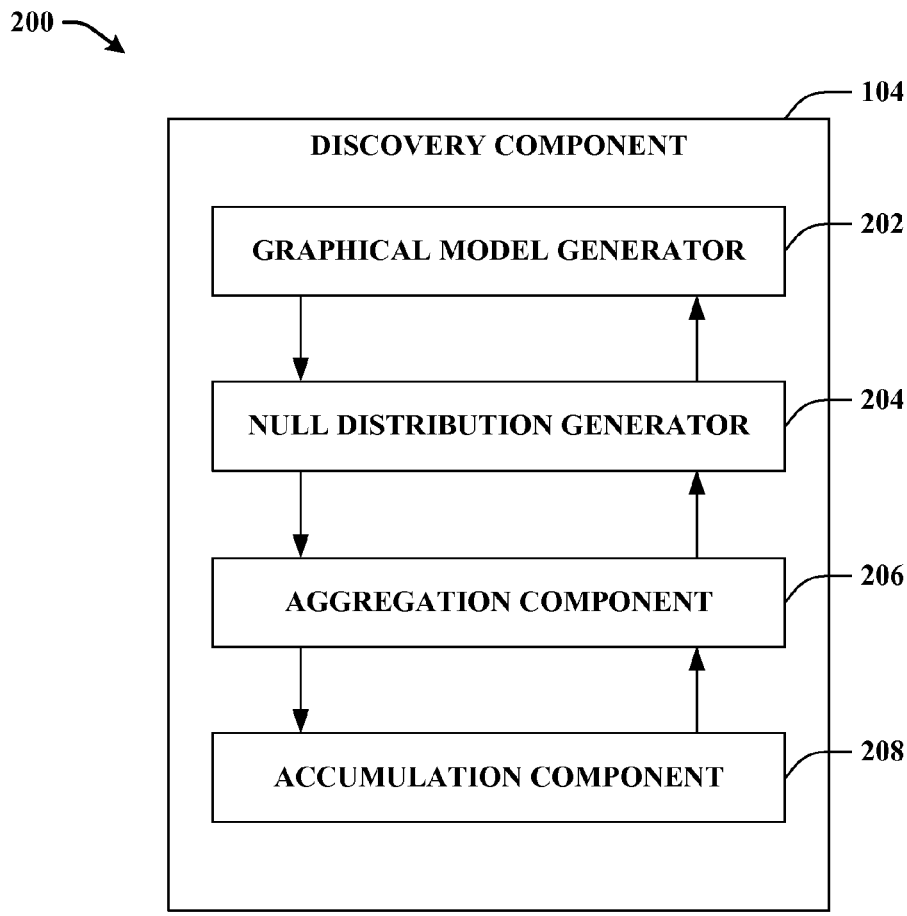
FIG. 2 provide a more detailed illustration of a discovery component that effectuates and facilitates determination of the number of non-spurious arcs associated with a learned graphical model in accordance with an aspect of the claimed subject matter.

FIG. 2 provides a more detailed depiction 200 of illustrative discovery component 104 in accordance with an aspect of the claimed subject matter. As illustrated discovery component 104 can include graphical model generator 202 that can construct graphical models based at least in part on received datasets and learning algorithms. Discovery component 104 can also include a null distribution generator 204 that can utilize received datasets to generate null datasets which in turn can be utilized together with previously employed learning algorithms (e.g., the same or similar learning algorithms that were used to create the initial graphical model can be applied to generated null datasets) to produce graphical models associated with the generated null datasets. Additionally, discovery component 104 can include aggregation component 206 that can identify and aggregate the number of arcs associated with graphical models associated with the generated null datasets. Once aggregation component 206 has aggregated and located all arcs associated with graphical models associated with generated null dataset, it can average the number of arcs identified for graphical models built using null dataset and thus providing an average number of false positives. Further, discovery component 104 can include accumulation component 208, that like aggregation component 206, locates or identifies and enumerates the number of arcs associated with the graphical model initially constructed (e.g., the graphical model built using the initial non-null dataset). The total number of arcs associated with the graphical model initially constructed provides a total number of arc hypotheses that can be considered true. Thus, the result produced by aggregation component 206 (e.g., the number of false positives) can be divided by the result developed by accumulation component 208 (e.g., the number of total hypotheses denoted as true) to provide a false discovery rate (FDR) that can be used to uncover patterns within data and based on the uncovered patterns to discern the certitude with which to perceive such uncovered patterns.

Figure 3:
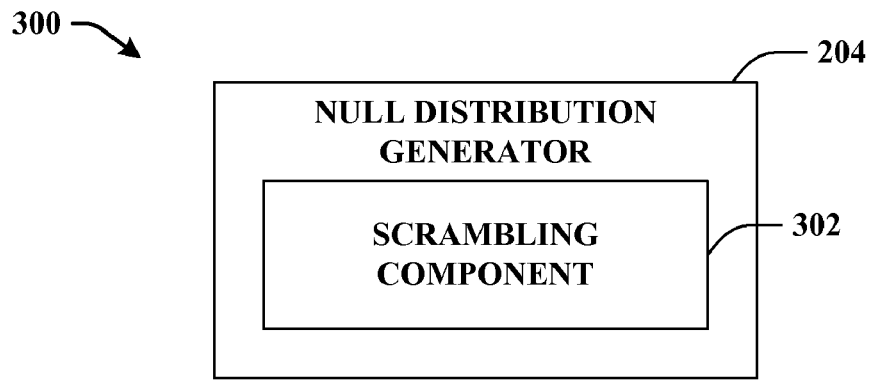
FIG. 3 provides a more detailed depiction of a null distribution generator that effectuates and facilitates determination of the number of non-spurious arcs associated with a learned graphical model in accordance with an aspect of the claimed subject matter.

FIG. 3 provides a more detailed illustration 300 of null distribution generator 204 in accordance with an aspect of the claimed subject matter. As depicted, null distribution generator can include scrambling component 302 that can receive or obtain datasets representative of graphical models wherein the datasets can typically be perceived as being in rows and columns, each row indicative of a case (e.g., HIV vaccine design) and each column exemplifies variables associated with a particular case. Scrambling component 302 upon receipt of datasets builds a different null distribution for each variable associated with a particular case. In order to construct different null distributions, scrambling component 302 randomly permutes the entries in a particular column for which the claimed subject matter is building a graphical model, thereby producing null data for a particular variable. It should be noted that null data should be generated for each variable in a received or obtained dataset.

Figure 4:
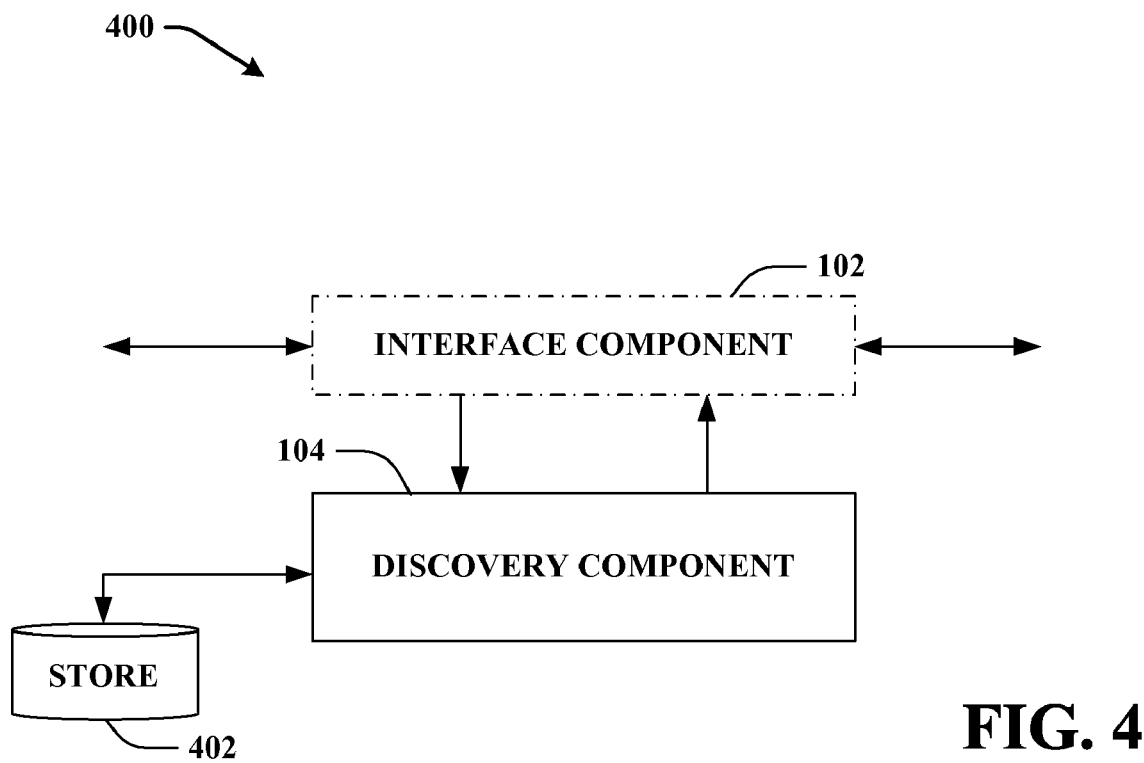
FIG. 4 illustrates a system implemented on a machine that effectuates and facilitates determination of the number of non-spurious arcs associated with a learned graphical model in accordance with an aspect of the claimed subject matter.

FIG. 4 depicts an aspect of a system 400 that effectuates and facilitates determination of the number of non-spurious arcs associated with a learned graphical model in accordance with an aspect of the claimed subject matter. System 400 can include store 402 that can include any suitable data necessary discovery component 104 to facilitate it aims. For instance, store 402 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 402 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 402 of the subject systems and methods is intended to comprise, without being limited to, these and any other suitable types of memory. In addition, it is to be appreciated that store 402 can be a server, a database, a hard drive, and the like.

Figure 5:
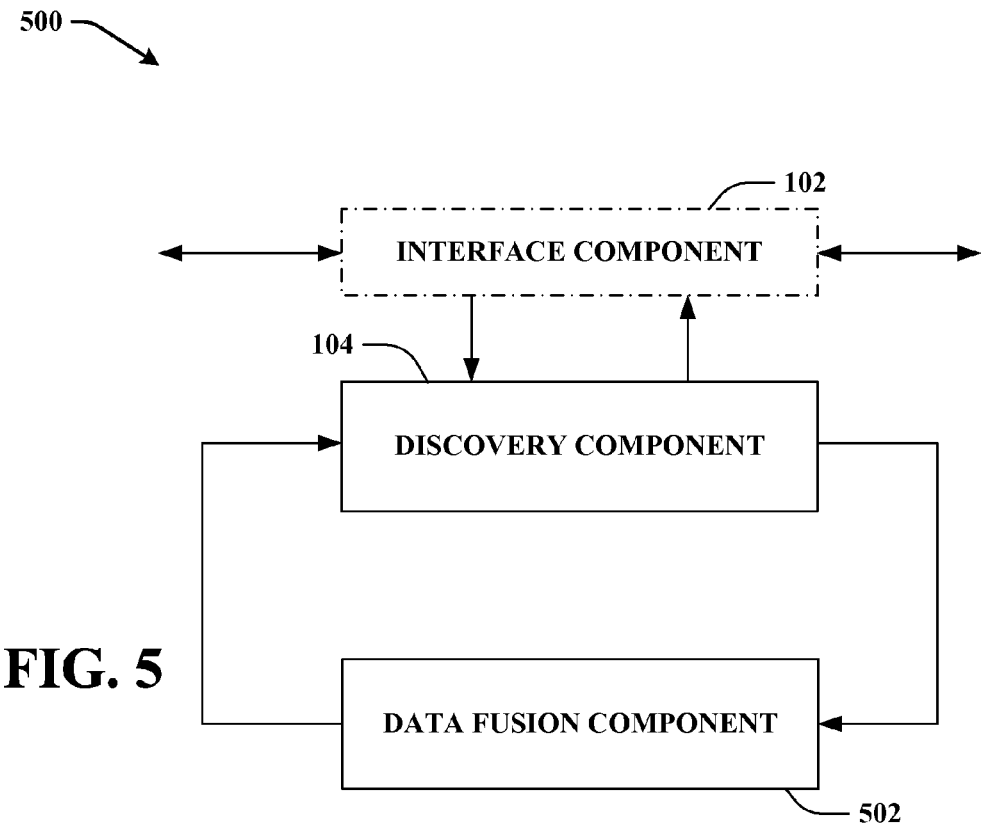
FIG. 5 provides a further depiction of a machine implemented system that effectuates and facilitates determination of the number of non-spurious arcs associated with a learned graphical model in accordance with an aspect of the claimed subject matter.

FIG. 5 provides yet a further depiction of a system 500 that effectuates and facilitates determination of the number of non-spurious arcs associated with a learned graphical model in accordance with an aspect of the claimed subject matter. As depicted, system 500 can include a data fusion component 502 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 502 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 6:
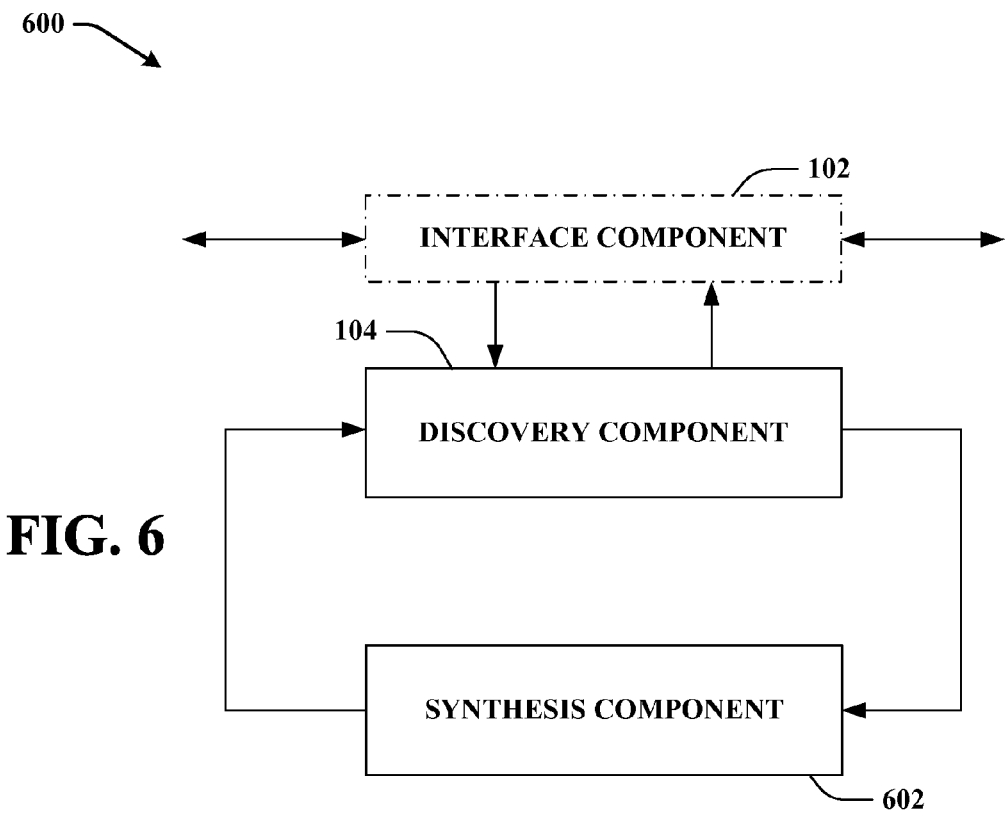
FIG. 6 illustrates yet another aspect of the machine implemented system that effectuates and facilitates determination of the number of non-spurious arcs associated with a learned graphical model in accordance with an aspect of the claimed subject matter.

FIG. 6 provides a further depiction of a system 600 that effectuates and facilitates determination of the number of non-spurious arcs associated with a learned graphical model in accordance with an aspect of the claimed subject matter. As illustrated discovery component 104 can, for example, employ synthesizing component 602 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 602 through combining and filtering can provide a set of information that can be more informative, or accurate (e.g., with respect to an entity's communicative or informational goals) and information from just one or two modalities, for example. As discussed in connection with FIG. 5, the data fusion component 502 can be employed to learn correlations between different data types, and the synthesizing component 602 can employ such correlations in connection with combining, or filtering the input data.

Figure 7:
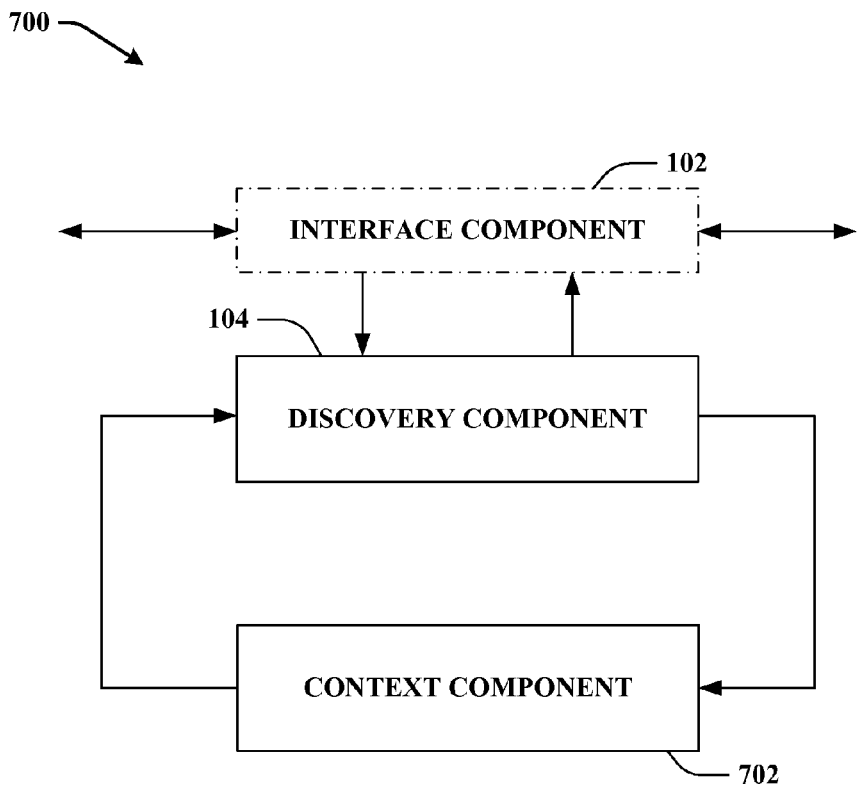
FIG. 7 depicts a further illustrative aspect of the machine implemented system that effectuates and facilitates determination of the number of non-spurious arcs associated with a learned graphical model in accordance with an aspect of the claimed subject matter.

FIG. 7 provides a further illustration of a system 700 that effectuates and facilitates determination of the number of non-spurious arcs associated with a learned graphical model in accordance with an aspect of the claimed subject matter. As illustrated discovery component 104 can, for example, employ context component 702 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 702 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 702 had knowledge that the user was not camping, and that it was near dinnertime, the utterance would be interpreted as "steak". On the other hand, if the context component 702 knew (e.g., via GPS system input) that the user recently arrived at a camping ground within a national park; it might more heavily weight the utterance as "stake".

In view of the foregoing, it is readily apparent that utilization of the context component 702 to consider and analyze extrinsic information can substantially facilitate determining meaning of sets of inputs.

Figure 8:
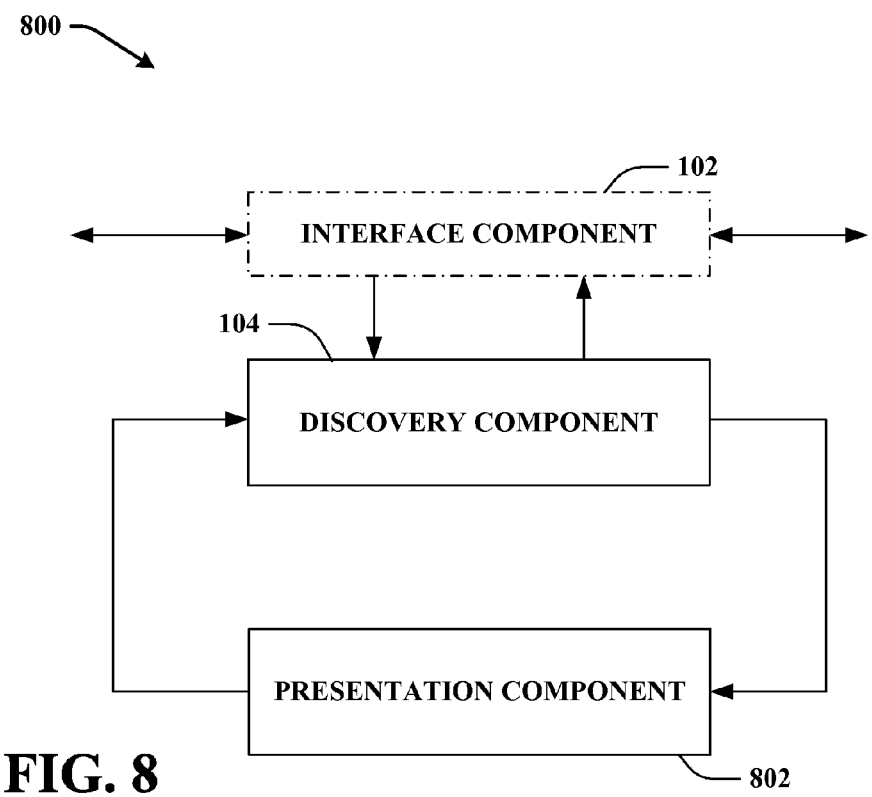
FIG. 8 illustrates another illustrative aspect of a system implemented on a machine that effectuates and facilitates determination of the number of non-spurious arcs associated with a learned graphical model in accordance with an aspect of the claimed subject matter.

FIG. 8 a further illustration of a system 800 that effectuates and facilitates determination of the number of non-spurious arcs associated with a learned graphical model in accordance with an aspect of the claimed subject matter. As illustrated, system 800 can include presentation component 802 that can provide various types of user interface to facilitate interaction between a user and any component coupled to discovery component 104. As illustrated, presentation component 802 is a separate entity that can be utilized with discovery component 104. However, it is to be appreciated that presentation component 802 and/or other similar view components can be incorporated into discovery component 104 and/or a standalone unit. Presentation component 802 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into discovery component 104.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 9:
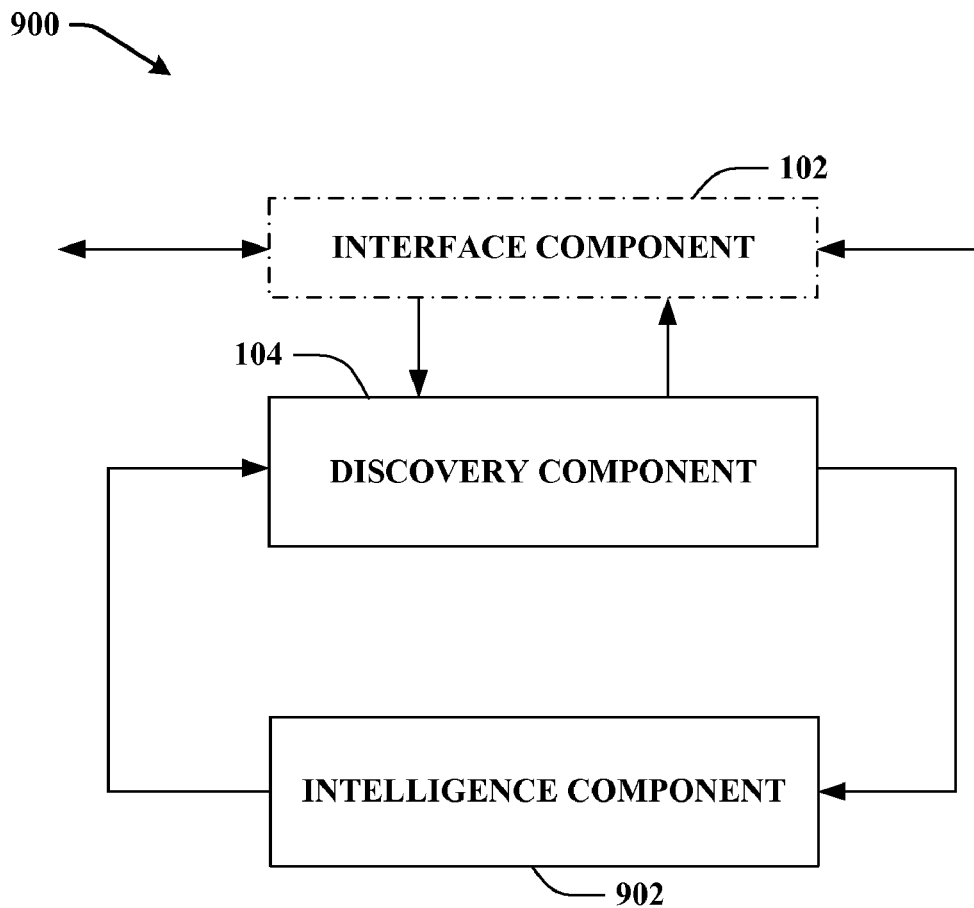
FIG. 9 depicts yet another illustrative aspect of a system that effectuates and facilitates determination of the number of non-spurious arcs associated with a learned graphical model in accordance with an aspect of the claimed subject matter.

FIG. 9 depicts a system 900 that employs artificial intelligence to that effectuate and facilitate determination of the number of non-spurious arcs associated with a learned graphical model in accordance with an aspect of the subject matter as claimed. Accordingly, as illustrated, system 900 can include an intelligence component 902 that can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 902 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 902 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 10:
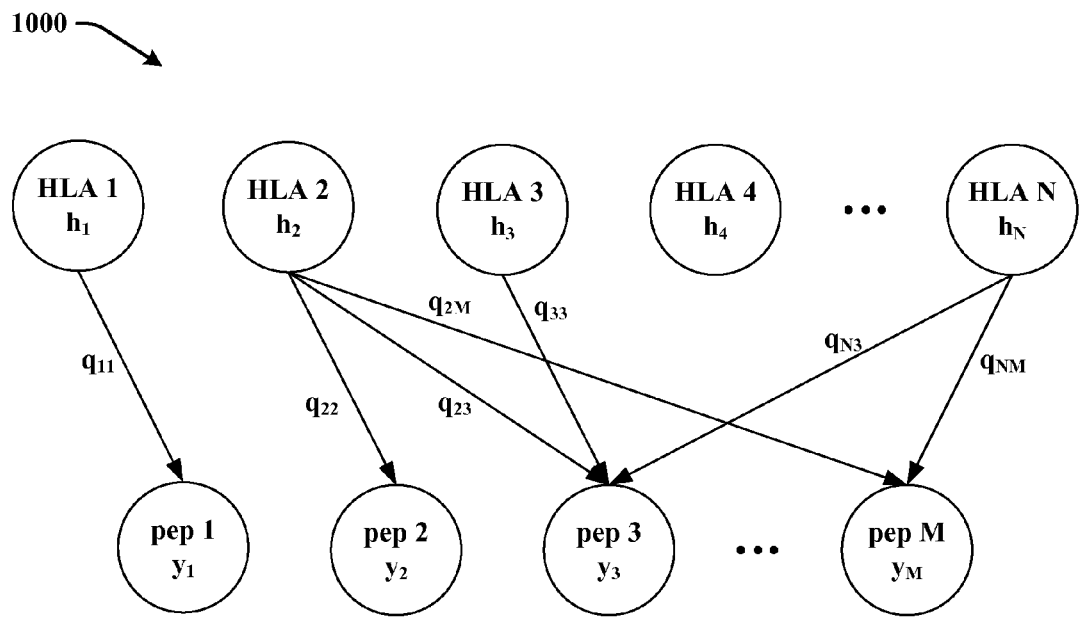
FIG. 10 depicts an illustrative bi-partite graph that can be employed in conjunction with the claimed subject to effectuate and facilitate determination of the number of non-spurious arcs associated with a learned graphical model in accordance with an aspect of the claimed subject matter.

FIG. 10 provides depiction of an illustrative bi-partite graph 1000 that can be employed in conjunction with the claimed subject to effectuate and facilitate determination of the number of non-spurious arcs associated with a learned graphical model in accordance with an aspect of the claimed subject matter. Keeping, without limitation, with the HIV theme set forth earlier, the illustrated bi-partite graph 1000 can be used to model which HLA types (e.g., depicted as the top row of nodes labeled HLA 1, HLA 2, HLA 3, HLA 4, . . . , HLA N, where N denotes an integer, natural number, or whole number greater than or equal zero (0)) interact with which HIV peptides (e.g., labeled as peptide 1, peptide 2, peptide 3, . . . , peptide M, where M is an integer, whole number, natural number greater than or equal zero (0)). In this instance, the probability of each peptide having a reaction can be parameterized by a noisy-OR distribution over its parents. All nodes can be observed as interest lies in finding arcs that are present. As exemplified in bi-partite graph 1000, peptide can have zero or several incoming arcs. Each person can have between three and six HLA molecules. Thus, for a given patient, between three and six HLA nodes should be "on" (e.g., HLA 1, HLA 2, HLA 3, and HLA N).

Figure 11:
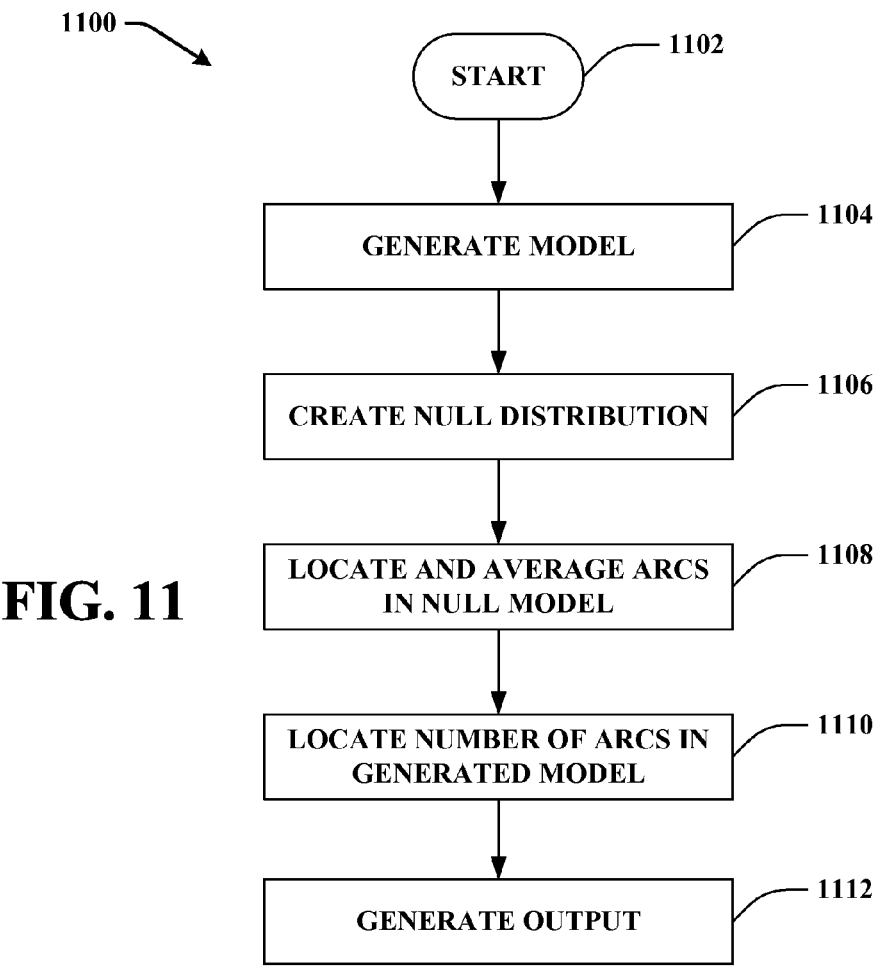
FIG. 11 illustrates a flow diagram of a machine implemented methodology that effectuates and facilitates determination of the number of non-spurious arcs associated with a learned graphical model in accordance with an aspect of the claimed subject matter.

In view of the exemplary systems shown and described supra, methodologies that may be implemented in accordance with the disclosed subject matter will be better appreciated with reference to the flow chart of FIG. 11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 11 illustrates a methodology 1100 that effectuates and facilitates determination of the number of non-spurious arcs associated with a learned graphical model in accordance with an aspect of the claimed subject matter. At 1102 various and sundry initialization tasks can be performed after which method 1100 can proceed to 1104. At 1104 learning algorithms and datasets descriptive of graphical models can be received at which point the received, solicited, or otherwise obtained learning algorithms can be applied to similarly elicited datasets descriptive of graphical models to provide an initial graphical model (e.g., a graphical model representative of the solicited datasets). At 1106 multiple null distribution datasets can be generated wherein each null distribution dataset created can be employed to generate/create a graphical model reflective of the produced null distribution dataset. Null distribution datasets can be created by randomly permuting one variable at a time in the received dataset (e.g., the dataset reflective of, and utilized to build, the initial graphical model). At 1108 the number of arcs associated with graphical models created using null distribution datasets can be identified, counted, and averaged. The average number of arcs associated with graphical models created using null distribution provides the numerator for the eventual output. At 1110 the number of arcs associated with the graphical model created using the dataset that was initially received can be identified and enumerated. The total number of arcs associated with the initial graphical model (e.g., the graphical model not created using null distribution datasets) provides the denominator for the eventual output. At 1112, the numerator produced at 1108 and the denominator generated at 1110 can be combined and thereafter can be output. The output can provide a proportion of non-spurious (or expected number) arcs in the learned graphical model.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 12:
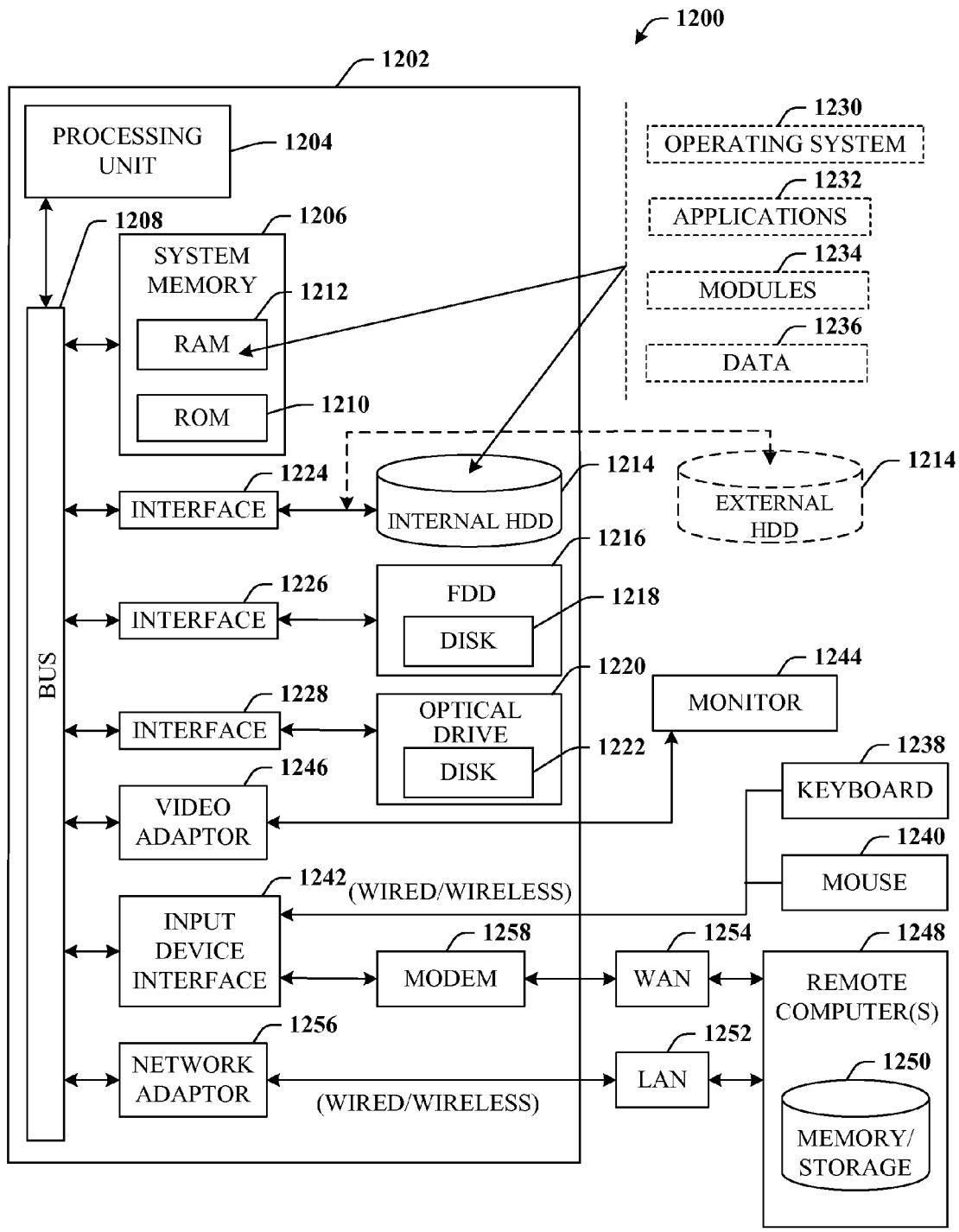
FIG. 12 illustrates a block diagram of a computer operable to execute the disclosed system in accordance with an aspect of the claimed subject matter.

Referring now to FIG. 12, there is illustrated a block diagram of a computer operable to execute the disclosed system. In order to provide additional context for various aspects thereof, FIG. 12 and the following discussion are intended to provide a brief, general description of a suitable computing environment 1200 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1294 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11 g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 13:
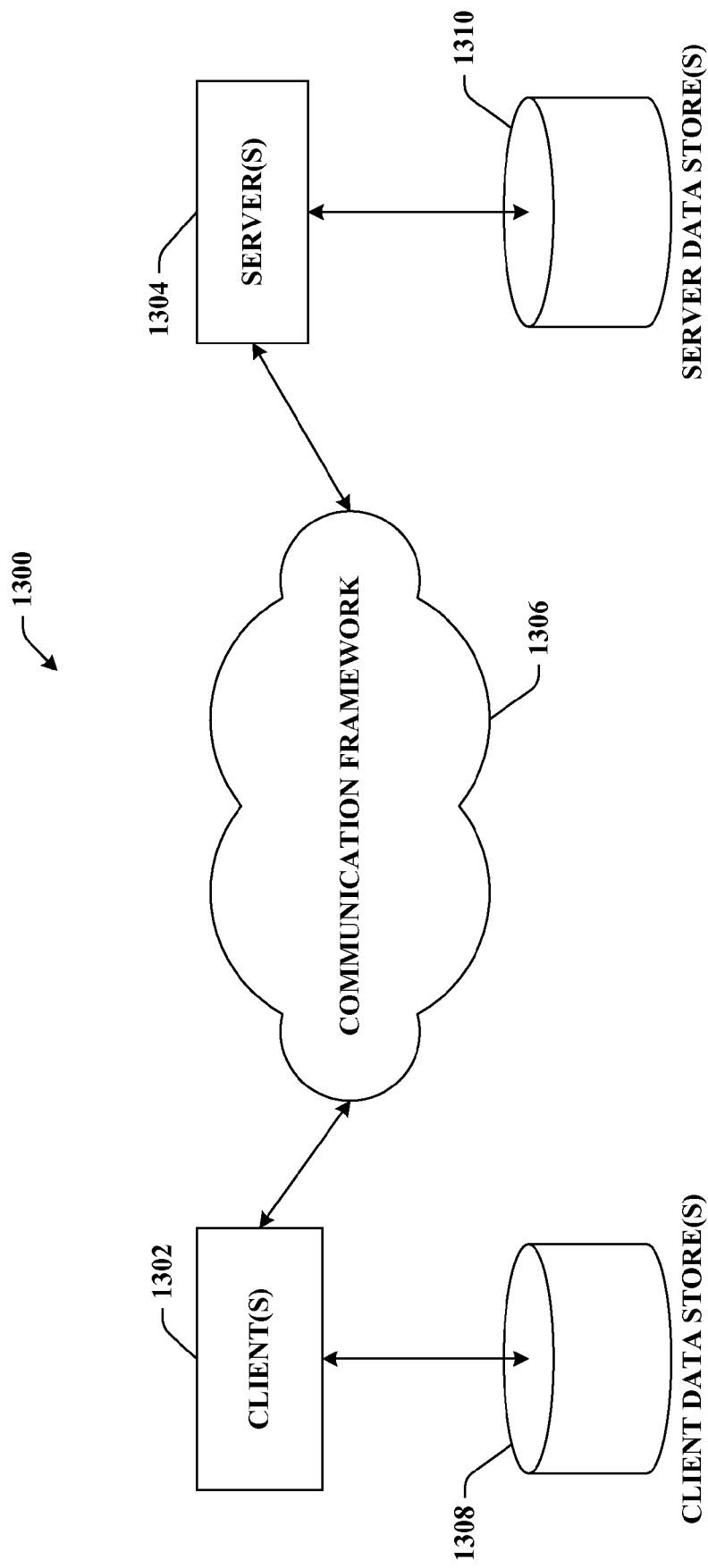
FIG. 13 illustrates a schematic block diagram of an exemplary computing environment for processing the disclosed architecture in accordance with another aspect.

Referring now to FIG. 13, there is illustrated a schematic block diagram of an exemplary computing environment 1300 for processing the disclosed architecture in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented method that determines a number of non-spurious arcs associated with a learned graphical model, comprising:
retrieving datasets and learning algorithms;
applying the learning algorithms against the datasets to generate the learned graphical model;
generating null distribution datasets based at least in part on retrieved datasets;
employing the learning algorithms and the null distribution dataset to generate graphical models associated with the null distribution datasets;
determining an average number of arcs associated with the graphical models associated with the null distribution datasets;
enumerating a total number of arcs associated with the learned graphical model; and
disseminating the average number of arcs and the total number of arcs, the average number of arcs provides a numerator value.

2. The method of claim 1, the average number of arcs and the total number of arcs provides a ratio of the non-spurious arcs associated with the learned graphical model.

3. The method of claim 1, the generating includes randomly permuting each of a plurality of variables associated with the datasets.

4. The method of claim 1, the total number of arcs provides a denominator value.

5. The method of claim 1, the learned graphical model represented as a bi-partite graph including nodes connected by arcs.

6. The method of claim 1, the graphical models associated with the null distribution datasets represented as a bi-partite graph includes a first row of nodes and a second row of nodes, the first row of nodes connected to the second row of nodes by zero or more arcs.

7. The method of claim 1, the learned graphical model or the graphical models associated with dataset represented as bi-partite graphs with noisy-OR distributions.

8. The method of claim 7, the noisy-OR distributions based on an assumption of independence of causal influence.

9. A system that determines a number of non-spurious arcs associated with a learned graphical model, comprising:
means for utilizing learning algorithms and datasets to generate the learned graphical model;
means for creating multiple null distribution datasets based on the datasets;
means for utilizing the learning algorithms and the multiple null distribution datasets to provide multiple graphical models associated with the multiple null distribution datasets;
means for ascertaining an average number of arcs associated with the multiple graphical models associated with the multiple null distribution datasets;
means for enumerating a total number of arcs associated with the learned graphical model; and
means for presenting the average number of arcs and the total number of arcs, the total number of arcs provides a denominator value.

10. The system of claim 9, the means for creating randomly permutes each of a plurality of variables included in the datasets.

11. The system of claim 9, the learned graphical model and the multiple models represented as bi-partite graphs with noisy-OR distributions.

12. The system of claim 11, the noisy-OR distributions based at least in part on assumptions of independence of causal influence.

13. A computer-readable memory device comprising:
A plurality of executable instructions stored on the computer-readable memory device and configured to program a computing device to perform operations including:
retrieving datasets and learning algorithms;
applying the learning algorithms against the datasets to generate the learned graphical model;
generating null distribution datasets based at least in part on retrieved datasets;

employing the learning algorithms and the null distribution dataset to generate graphical models associated with the null distribution datasets;

determining an average number of arcs associated with the graphical models associated with the null distribution datasets;

enumerating a total number of arcs associated with the learned graphical model; and disseminating the average number of arcs and the total number of arcs, the average number of arcs provides a numerator value and the total number of arcs provides a denominator value.

14. The computer-readable memory device of claim 13, wherein the datasets includes a plurality of variables, and the operations include randomly permuting each of the plurality of variables to generate the null distribution datasets.

15. The computer-readable memory device of claim 13, the learned graphical model or the graphical models associated with the null distribution sets represented as bi-partite graphs with noisy-OR distributions.

16. The computer-readable memory device of claim 15, the noisy-OR distributions based at least in part on an assumption of independence of causal influence.

* * * * *